US007829182B2

(12) United States Patent
Wakai et al.

(10) Patent No.: US 7,829,182 B2
(45) Date of Patent: Nov. 9, 2010

(54) COATED PAPER FOR PRINTING

(75) Inventors: Chizuru Wakai, Tokyo (JP); Hidehiko Kai, Tokyo (JP); Seiki Yoneshige, Tokyo (JP); Hirokazu Morii, Tokyo (JP)

(73) Assignee: Nippon Paper Industries, Co., Ltd., Tokyo (JP)

( * ) Notice: Subject to any disclaimer, the term of this patent is extended or adjusted under 35 U.S.C. 154(b) by 873 days.

(21) Appl. No.: 10/502,877

(22) PCT Filed: Mar. 29, 2002

(86) PCT No.: PCT/JP02/03186

§ 371 (c)(1),
(2), (4) Date: Mar. 28, 2005

(87) PCT Pub. No.: WO02/079573

PCT Pub. Date: Oct. 10, 2002

(65) Prior Publication Data

US 2005/0170110 A1 Aug. 4, 2005

(30) Foreign Application Priority Data

Mar. 29, 2001 (JP) ............................ 2001-097595
Mar. 28, 2002 (JP) ............................ 2002-090076

(51) Int. Cl.
*B32B 5/16* (2006.01)

(52) U.S. Cl. .................... 428/206; 428/207; 428/211.1; 428/219; 428/327; 428/342

(58) Field of Classification Search ..... 428/32.1–32.38, 428/206, 207, 211.1, 219, 327, 342; 162/206
See application file for complete search history.

(56) References Cited

U.S. PATENT DOCUMENTS 2,024,248 A * 12/1935 Rafton ........................ 118/61
2,251,890 A * 8/1941 Montgomery ............... 162/206
3,268,354 A 8/1966 Hain
3,268,470 A * 8/1966 Sheers et al. .................. 524/99
3,853,579 A * 12/1974 Heiser ........................ 428/323
3,941,736 A * 3/1976 Aldrich ...................... 524/499
4,317,849 A 3/1982 Ogura et al.
4,335,184 A * 6/1982 Miyamoto et al. .......... 428/342
4,954,395 A * 9/1990 Hasegawa et al. ........ 428/32.24
5,122,568 A * 6/1992 dePierne et al. ............. 524/824
5,162,289 A * 11/1992 Betts et al. .................. 503/226
5,270,103 A 12/1993 Oliver et al.
5,302,439 A 4/1994 Malhotra et al.
5,326,391 A * 7/1994 Anderson et al. ........... 106/409
5,342,649 A * 8/1994 Sarokin ...................... 427/150
5,360,657 A 11/1994 Kano et al.
5,451,466 A 9/1995 Malhotra
5,576,088 A 11/1996 Ogawa et al.
5,591,489 A * 1/1997 Dragner et al. .............. 427/364
5,605,750 A * 2/1997 Romano et al. .......... 428/32.17
5,648,420 A 7/1997 Fujiwara et al.
5,663,022 A 9/1997 Malhotra
5,709,976 A 1/1998 Malhotra
5,750,200 A * 5/1998 Ogawa et al. ............... 427/361
5,985,367 A 11/1999 Nishijima et al.
6,020,058 A * 2/2000 Pekala et al. ............. 428/32.34
6,458,413 B1 10/2002 Hirabayashi et al.
6,902,794 B2 6/2005 Hirabayashi et al.
7,101,459 B2 9/2006 Nisogi et al.
2001/0015745 A1 * 8/2001 Onishi et al. ................ 347/101
2003/0170574 A1 9/2003 Rieger et al.
2005/0089651 A1 4/2005 Okomori et al.
2006/0005933 A1 1/2006 Okomori et al.

FOREIGN PATENT DOCUMENTS

| | | | |
|---|---|---|---|
| CA | 2153182 | | 1/1996 |
| DE | 195 24 528 | A1 | 1/1996 |
| DE | 19524528 | A | 1/1996 |
| EP | 430391 | | 6/1991 |
| EP | 0 631 013 | A1 | 12/1994 |
| EP | 1 403 427 | A1 | 3/2004 |

(Continued)

OTHER PUBLICATIONS

Definition of surface-active agent. Acquired Oct. 21, 2008. Lewis, Richard J., Sr. (2002). Hawley's Condensed Chemical Dictionary (14th Edition). John Wiley & Sons. Online version available at: http://knovel.com/web/portal/browse/display?_EXT_KNOVEL_DISPLAY_bookid=704&VerticalID=0.*

The Office Action mailed Mar. 28, 2008 issued in U.S. Appl. No. 10/509,270, filed May 19, 2005.

The Office Action mailed Dec. 4, 2008 issued in U.S. Appl. No. 10/509,270, filed May 19, 2005.

*Primary Examiner*—Mark Ruthkosky
*Assistant Examiner*—Gerard T Higgins
(74) *Attorney, Agent, or Firm*—Knobbe Martens Olson & Bear LLP

(57) ABSTRACT

A coated printing paper offering high gloss, no mottled impression, sufficiently practical levels of printability in terms of ink-drying property and surface peel strength, and good productivity achieved by elimination of deposits on the calender rolls, wherein the coated printing paper comprises a base paper and a coating layer comprising pigment and adhesive formed on the base paper, and wherein a surface layer comprising 100 weight-parts of thermoplastic copolymer with a glass-transition temperature of 80° C. or above and 3 to 100 weight-parts of surface sizing agent of styrene-acrylic, olefin or styrene-maleic acid copolymer type is formed on the coating layer.

3 Claims, No Drawings

FOREIGN PATENT DOCUMENTS

| | | | |
|---|---|---|---|
| EP | 1 489 230 | A1 | 12/2004 |
| JP | 57-93193 | | 6/1982 |
| JP | 57-093193 | A | 6/1982 |
| JP | 60-199999 | | 10/1985 |
| JP | 64-010638 | | 1/1989 |
| JP | 03-167396 | | 7/1991 |
| JP | 04-272297 | | 9/1992 |
| JP | 04-272297 | A | 9/1992 |
| JP | 08-13390 | | 1/1996 |
| JP | 08-260389 | | 10/1996 |
| JP | 09-268493 | | 10/1997 |
| JP | 09-324395 | | 12/1997 |
| JP | 2000-43408 | | 2/2000 |
| JP | 2000-234292 | | 8/2000 |
| JP | 2002-363888 | | 12/2000 |
| JP | 2001-73295 | | 3/2001 |
| JP | 2002-129490 | | 5/2002 |
| JP | 2002-363889 | | 12/2002 |
| JP | 2003-155692 | | 5/2003 |
| JP | 2003-328294 | | 11/2003 |
| JP | 2004-091986 | | 3/2004 |
| JP | 2005-054331 | | 3/2005 |
| WO | WO 02/079573 | A1 | 10/2002 |
| WO | WO 03/083213 | A1 | 10/2003 |

* cited by examiner

COATED PAPER FOR PRINTING

This application is the U.S. National Phase under 35 U.S.C. §371 of International Application PCT/JP02/03186, filed on Mar. 29, 2002, which claims priority of Japanese Patent Application Nos. 2001-097595 filed on Mar. 29, 2001 and 2002-090076 filed on Mar. 28, 2002. The International Application was published under PCT Article 21(2) in a language other than English.

FIELD OF THE INVENTION

This invention relates to a high-gloss coated paper offering excellent printability.

Specifically, the invention relates to a coated printing paper having a surface layer formed by applying and drying a mixed solution of thermoplastic copolymer and surface sizing agent, which produces no mottled impression, provides sufficiently practical levels of printability in terms of ink-drying property and surface peel strength, and leaves no deposits on the calender rolls.

BACKGROUND OF THE INVENTION

Coated papers, which have a coating layer comprising pigment and binder, are used as high-quality printing papers. As such, in addition to printability in terms of ink absorbency and strength of coating layer, it is also important for coated papers to achieve sufficient gloss on the surface of coating layer. However, pressure-smoothing the surface of coating layer for the purpose of achieving higher gloss will inevitably crush the voids in the coating layer and thereby reduce the paper's ink-absorbing capability. In addition, the use as a pigment binder of a large amount of water-soluble or water-dispersant polymer substance, such as copolymer latex, will improve the strength and gloss of the coating layer, but it will also decrease the voids in the coating layer and thereby reduce the paper's ink-absorbing capability. In this sense, gloss and printability are mutually exclusive. Accordingly, with coated papers the types and blending ratios of pigment and adhesive, weight of coating material, degree of smoothing and other factors are determined in a manner achieving an optimal balance between gloss and printability. However, different technologies are needed to obtain high-gloss paper offering excellent printability. In general, the gloss of coated printing paper improves in the order of fine-coated paper, coated paper, art paper, super art paper and cast-coated paper, with cast-coated paper offering the highest gloss. In the present invention, the term "high gloss" means a level of gloss equivalent to or better than that of super art paper. Therefore, high-gloss paper means a coated printing paper having a gloss equivalent to or better than that of super art paper.

The conventional production methods of high-gloss paper include one using a cast coater. Under this method, a wet coating layer comprising pigment and binder is pressure-bonded using a mirrored cast drum and then heated and dried. This method has a drawback in that the production speed is reduced significantly compared with general art paper, coated paper and fine-coated paper.

A production method using a thermal calender, instead of a cast drum, is also known. For example, Japanese Patent Application Laid-open No. 56-68188 and Japanese Patent Publication Nos. 64-10638 and 64-11758 describe methods to produce a coating layer by mixing pigment with polymer latex or water-soluble polymer resin, applying and drying the coating layer, and then treating the coating layer by heat calendering. In these published technologies, a polymer latex with a glass-transition temperature of 5° C., or 38° C. or above, is applied on a support material, and the obtained coating layer is treated with a thermal calender at a temperature above the glass-transition temperature of the latex used. This provides a simple and productive method that is suitable for producing normal coated paper. However, the method results in an insufficient gloss inferior to that of cast-coated paper and even art paper. With thermal calendering, therefore, a level of gloss comparable to that of cast-coated paper cannot be achieved.

A yet another method is the one described in Japanese Patent Application Laid-open No. 59-22683. Under this method, two or more copolymer latexes of different minimum film-formation temperatures are applied on a sheet or sheet having a pigment coating layer and then dried, after which calendering is applied as necessary to smoothen the surface. When dried, the latexes of different minimum film-formation temperatures will generate minute cracks on the surface of coated paper, thereby achieving good ink absorbency without reducing gloss. The key point of this technology is to generate minute cracks on the surface of coated paper, and the drying condition must be given due attention in order to achieve this effect. In other words, the drying condition must be set so that the latex of the lower minimum film-formation temperature will melt completely while that of the higher minimum film-formation temperature will melt only partially. However, it is a common knowledge that drying conditions are generally subject to fluctuations by a number of factors. When it comes to potential industrial applications of this technology, it is virtually impossible to maintain a uniform, constant drying condition throughout the production process. Therefore, under this technology it is extremely difficult to produce papers of stable quality.

As disclosed in Japanese Patent Application Laid-open Nos. 3-167396 and 8-13390, the inventors found that a gloss equivalent to that of coated paper can be achieved without smoothing and that excellent printability in terms of ink absorbency and surface strength can also be achieved, by designing a coated printing paper that comprises a base material having a support material and a pigment coating layer applied on top, wherein the pigment coating layer has a surface layer made of a thermoplastic polymer (emulsion comprising a polymer or copolymer exhibiting thermoplasticity) with a second order transition temperature of 80° C.; and the inventors also found that by calendering the aforementioned surface layer at temperatures not exceeding the second order transition temperature of copolymer latex a high gloss equivalent to or better than that of super art paper can be achieved, together with sufficiently practical levels of printability in terms of ink absorbency, surface strength and dot-error ratio, while eliminating deposits on the calender rolls and thereby attaining higher productivity and manufacturing efficiency. However, these methods had problems in sheet-feed press, such as mottled ink impression, poor printability and insufficient separation from the calender rolls.

SUMMARY OF THE INVENTION

In light of the situations described above, the purpose of the present invention is to provide a high-gloss coated printing paper offering high sheet gloss, excellent ink absorbency and surface strength, no mottled impression of ink particularly in sheet-feed press, good ink-drying property and excellent printability, as well as a method for producing such coated printing paper easily and at affordable cost by ensuring a constant, stable quality.

The above issues were resolved by preparing a base material from a support material and a pigment coating layer on top, wherein a surface layer containing a mixture of a thermoplastic polymer with a glass-transition temperature of 80° C. or above and a surface sizing agent is formed on the coating layer. This method would yield a coated printing paper offering high sheet gloss, excellent ink absorbency and surface strength, no mottled impression of ink and excellent printability. The surface layer proposed by the present invention should comprise 100 weight-parts of thermoplastic polymer and 3 to 100 weight-parts, or more preferably 3 to 50 weight-parts, or most preferably 3 to 20 weight-parts of surface sizing agent, in order to achieve a good balance of high gloss, mottled impression of ink and ink-drying property.

The use of a thermoplastic polymer with a high glass-transition temperature and a surface sizing agent is a likely reason for the high gloss achieved by providing the surface layer proposed by the present invention, since they fill the concaves in the pigment coating layer and thereby optically smoothen the surface layer on the whole.

A surface layer consisting only of thermoplastic polymer causes ink to be absorbed unevenly as it is transferred onto the paper. Therefore, ink does not dry uniformly and causes "trapping," or a non-uniform transfer of ink, in subsequent printing passes, which results in mottled impression on the printed surface. On the other hand, a surface layer consisting only of surface sizing agent offers poor printing efficiency, since ink does not dry quickly after being transferred onto the paper. The present invention eliminated mottled impression while achieving good ink-drying property, without sacrificing the characteristics affecting paper quality, by combining a thermoplastic polymer with a high glass-transition temperature and a surface sizing agent.

The reason is explained as follows: A surface layer consisting only of thermoplastic polymer has minute voids existing unevenly at the surface of the surface layer where the thermoplastic polymer particles retain their shape, and therefore such surface layer absorbs ink unevenly; whereas the same surface layer, when a surface sizing agent is added, will have the voids filled or covered by the surface sizing agent, thereby allowing ink to permeate more evenly and dry more quickly.

BEST MODE FOR CARRYING OUT THE INVENTION

The base material used in the present invention must comprise a base paper and a pigment coating layer formed on top that contains pigment and adhesive. The base paper can be a desired paper as long as a pigment coating layer can be formed on top. Examples include uncoated papers such as medium-grade paper, premium-grade paper, newspaper, single-side gloss paper and special gravure paper. A pigment coating layer can be easily formed on an uncoated paper using the normal production method for pigment-coated paper. Depending on the desired quality, however, the types and volumetric ratios of pigment and adhesive in the coating material should be changed as necessary.

Pigments that can be used in the pigment coating layer proposed by the present invention include conventional pigments including inorganic pigments such as kaolin, clay, delaminated clay, ground calcium carbonate, precipitated calcium carbonate, talc, titanium dioxide, barium sulfate, calcium sulfate, zinc oxide, silicic acid, silicate, colloidal silica and satin white, as well as organic pigments such as plastic pigment. These pigments can be used alone or in combination. In the present invention, it is preferable to blend 50 weight-parts or more of kaolin for 100 weight-parts of pigment, in order to achieve greater printability while maintaining high gloss.

Adhesives that can be used in the pigment coating layer proposed by the present invention include adhesives conventionally used in the production of normal coated paper, including various copolymers such as styrene-butadiene, styrene-acrylic, ethylene-vinyl acetate, butadiene-methyl methacrylate and vinyl acetate-butyl acrylate copolymers; synthetic adhesives such as polyvinyl alcohol, maleic anhydride copolymer and acrylic methyl methacrylate copolymer; proteins such as casein, soybean protein and synthetic protein; starches such as oxidized starch, cationic starch, urea phosphate esterified starch, hydroxyethyl etherified starch and other etherified starches, and dextrin; and cellulose derivatives such as carboxyethyl cellulose, hydroxyethyl cellulose and hydroxymethyl cellulose. One or more of these adhesives may be selected and used as necessary. Adhesive should account for 5 to 50 weight-parts, or preferably 5 to 25 weight-parts, with respect to 100 weight-parts of pigment. Of particular preference is a combination of 13 weight-parts or less of styrene-butadiene copolymer latex with 100 weight-parts of pigment, which will produce good ink-drying property. If necessary, appropriate amounts of dispersant, viscosity-increasing agent, water-retaining agent, defoaming agent, water-proofing agent, coloring agent, printability-improving agent and various other agents used in the coating material compositions for use in normal coated papers may be applied.

One or more pigment coating layers may be formed on one or both sides of the base paper. The weight of the coating layer proposed by the present invention should preferably be 2 to 40 $g/m^2$, or more preferably 5 to 25 $g/m^2$, or most preferably 8 to 20 $g/m^2$, per side of the base paper.

The methods to apply a pigment coating layer on the base paper include a double-roll size-press coater or gate-roll coater, blade-metering size-press coater or rod-metering size-press coater, sym-sizer or other film-transfer roll coater, flooded-nip/blade coater, jet-fountain/blade coater and short-dowel time-application coater. A rod-metering coater using grooved rods or plain rods instead of blades, curtain coater, die coater or any other known coater may also be used.

In the present invention, after a pigment coating layer has been formed on the base paper, a mixed solution of thermoplastic polymer and surface sizing agent is applied on top of the pigment coating layer as a surface layer. Before applying the mixed solution, the pigment coating layer may be smoothened via a super calender, gloss calender, high-temperature soft-nip calender and so on.

Any thermoplastic polymer used in the above surface layer proposed by the present invention should comprise emulsion particles of a polymer or copolymer having thermoplasticity and a glass-transition temperature of 80° C. or above, so that the particle shape will be retained after hot-air drying or calendering. In the case of a core-shell polymer or copolymer, the glass-transition temperature of the shell should be 80° C. or above. As long as a glass-transition temperature of 80° C. or above is achieved, the types of monomers comprising the target polymer or copolymer, as well as the production method of the polymer or copolymer, are of no concern. Examples of preferred component monomers include styrene and its derivatives, vinylidene chloride, and ether acrylate or methacrylate. There is no limitation as to how high the glass-transition temperature of thermoplastic polymer can be. The maximum allowable glass-transition temperature of thermoplastic polymer is chiefly determined by the types of monomers and additives such as plasticizer used in the production of thermoplastic polymer, and is normally around 130° C.

When a polymer or copolymer with a glass-transition temperature of below 80° C. is used, the obtained coated paper will have poor gloss and leave deposits on the calender rolls during calendering. Any thermoplastic polymer used in the present invention should ideally have an average particle size of 100 nm or less, in order to achieve high gloss and surface strength.

Surface sizing agents that can be used in the surface layer proposed by the present invention include copolymer surface sizing agents such as styrene-acrylic, styrene-maleic acid, styrene-methacrylate, olefin and urethane types. These sizing agents can be used alone or in combination. Sizing agents should be of solution or emulsion type and must not retain particle shape after hot-air drying or calendering. A preferred average molecular weight of copolymer is 1000 to 500000. Among the copolymer surface sizing agents meeting these conditions, those of styrene-acrylic, olefin or styrene-maleic acid type are desirable. In particular, a styrene-acrylic sizing agent will achieve high sheet gloss.

In the present invention, a mixed solution of thermoplastic polymer and surface sizing agent is applied on the pigment coating layer as a surface layer. As long as the purpose of the present invention is not compromised in any way, a surface-layer coating solution may be prepared by adding, as necessary, a natural or synthetic resin adhesive for general paper coating for the purpose of adjusting the strength of the coated layer, a fluidity-adjusting agent or defoaming agent for the purpose of adjusting the coatability of coating material, a lubricant for the purpose of reducing deposits left on the calender or other cylinder rolls, and a coloring agent or small amounts of pigment for the purpose of adding color to the surface of coating layer. Preferably the thermoplastic polymer and surface sizing agent should account for 80 to 100 weight-percent of the overall surface layer in solid content. The surface-layer coating solution thus obtained will then be applied on the pigment coating layer as a surface layer. The coating weight can be adjusted as necessary to achieve desired properties. However, increasing the coating weight excessively will not only increase cost, but it will also reduce ink absorbency that leads to insufficient setting of ink and will also reduce the strength of the surface layer. Given these undesirable trends, it is not advisable to apply an excessive amount of surface layer. Normally a coating weight of approx. 0.1 $g/m^2$, or preferably 0.3 to 3.0 $g/m^2$, per side of the base paper is sufficient.

The surface-layer coating solution may be applied using a blade coater, roll coater, air-knife coater, bar coater, gravure coater or flexo-coater, all of which are generally used in paper coating. When thermoplastic polymer and sizing agent are applied, as proposed in the present invention, no special conditions are necessary in the drying process after coating. The normal drying condition used in the production of coated paper will provide an optimal surface layer. The coated printing paper thus obtained will offer, after calendering, a high gloss equivalent to or better than that of super art paper. In calendering, a super calender, gloss calender or high-temperature soft-nip calender may be used alone or in combination. These calender machines are normally used in the smoothing of coated paper. In the present invention, applying calendering at a metal roll temperature of 100° C. or above, or even 150° C. or above, will still maintain good separation of the coated surface from the calender rolls. Even without calendering, a coated printing paper offering a good sheet gloss equivalent to that of glossy paper can be achieved.

EXAMPLES

The following is a detailed explanation of the present invention using examples. Note, however, that the invention will not be limited in any way to the examples provided. Unless otherwise specified, the terms "parts" and "%" used in the examples indicate "weight-part(s) in solid content" and "weight-percent in solid content," respectively.

(Production of Thermoplastic Copolymer A)

A four-neck flask equipped with an agitator, thermometer, cooling unit, dripping funnel and nitrogen-gas introduction tube was prepared, in which 300 parts of water, 9 parts of sodium dodecylbenzenesulfonate and 4 parts of polyoxyethylene phenol ether (containing 10 mols of ethylene oxide) were placed and mixed. Next, a monomer mixture comprising 80 parts of styrene, 10 parts of α-methyl styrene, 100 parts of methyl methacrylate and 10 parts of methacrylate was prepared, and 60 parts of the mixture was placed in the flask. The temperature was raised to 60° C. concurrently with nitrogen replacement, and 7.2 parts of 20% aqueous ammonium peroxide solution and 4.8 parts of 20% sodium bisulfurous anhydride solution were added and polymerized for 60 minutes. Then, 10 parts of 20% aqueous ammonium peroxide solution was added and the remaining 140 parts of the monomer mixture was dripped over a period of one hour. The resulting mixture was kept at 90° C. for four hours to complete the polymerization, and thus achieved an emulsion of thermoplastic copolymer A. This emulsion had a solid content of 39%, glass-transition temperature of 107° C. and average particle size of 75 nm.

(Thermoplastic Copolymer B)

A four-neck flask equipped with an agitator, thermometer, cooling unit and nitrogen-gas introduction tube was prepared, in which 310 parts of water, 5.6 parts of HITENOL N-08 (a polyoxyethylene nonylphenol ether sulfate manufactured by Dai-ichi Kogyo Seiyaku), 48 parts of styrene, 19 parts of methyl methacrylate, 8 parts of ethyl methacrylate, 2.5 parts of divinyl benzene and 2.5 parts of methacrylate were placed. The temperature was raised to 70° C. concurrently with nitrogen replacement, after which 5 parts of 16% aqueous potassium peroxide solution was added and kept at 85° C. for four hours to complete polymerization, and thus achieved an emulsion of thermoplastic copolymer B. This emulsion had a solid content of 21%, glass-transition temperature of 85° C. and average particle size of 75 nm.

(Thermoplastic Copolymer C)

Polystyrene emulsion with a glass-transition temperature of 100° C. and average particle size of 60 nm: Lytron 604 by OMNOVER (Thermoplastic Copolymer D)

The same operation used to obtain thermoplastic copolymer A was repeated, except that 88 parts of styrene, 38 parts of methyl methacrylate, 70 parts of n-butyl methacrylate and 4 parts of methacrylate were used as the monomers, and obtained an emulsion of thermoplastic copolymer D. This emulsion had a solid content of 39% and glass-transition temperature of 72° C.

(Surface Sizing Agent A)

Styrene-acrylic sizing agent (solution type): POLYMARON-NS-15-2 by Arakawa Chemical Industries (Surface Sizing Agent B)

Styrene-acrylic sizing agent (emulsion type): POLYMARON-NS-15-1 by Arakawa Chemical Industries (Surface Sizing Agent C)

Olefin sizing agent (solution type): POLYMARON 482S by Arakawa Chemical Industries (Surface Sizing Agent D)

Styrene-maleic acid sizing agent: K-4 by Harima Chemicals

Production of Base Material (Pigment-Coated Paper)

A coating solution for coated paper with a solid content of 64% was prepared from 70 parts of first-grade kaolin, 30 parts of particulate ground calcium carbonate, 11 parts of styrene-butadiene copolymer latex and 5 parts of starch.

Using a blade coater operated at a coating speed of 500 m/min, the obtained coating solution was applied on both sides of a premium-grade coating base paper with a grammage of 127 g/m$^2$, so that the dry weight of the coating layer on one side would become 14 g/m$^2$. After drying, a base material before surface coating (pigment-coated paper), having a pigment coating layer with a moisture content of 5.5%, was obtained.

Example 1

A surface-layer coating solution with a solid content of 30% was prepared from 100 parts of thermoplastic copolymer A, 15 parts of styrene-acrylic surface sizing agent A, 5 parts of lubricant of polyethylene-wax emulsion type and 10 parts of lubricant of fatty-acid derivative type.

Using a blade coater operated at a coating speed of 500 m/min, the obtained coating solution was applied on both sides of the aforementioned base paper (pigment-coated paper), so that the dry weight of the coating layer on one side would become 1.0 g/m$^2$. After drying, a coated paper with surface coating, with a moisture content of 6.5%, was obtained. Then, the paper was treated on a super calender comprising chilled rolls (65° C.) and cotton rolls, at a nip pressure of 180 kg/cm and speed of 10 m/min for 2 nips, to obtain a coated printing paper.

Example 2

A coated printing paper was obtained in the same manner as in Example 1, except that surface sizing agent A was changed to styrene-acrylic surface sizing agent B.

Example 3

A coated printing paper was obtained in the same manner as in Example 1, except that thermoplastic copolymer A was changed to thermoplastic copolymer B.

Example 4

A coated printing paper was obtained in the same manner as in Example 1, except that the paper was not given super calendering but treated on a soft calender comprising metal rolls (surface temperature: 180° C.) and elastic rolls, at a nip pressure of 130 kg/cm and speed of 270 m/min for 2 nips.

Example 5

A coated printing paper was obtained in the same manner as in Example 1, except that surface sizing agent A was changed to olefin surface sizing agent C.

Example 6

A coated printing paper was obtained in the same manner as in Example 1, except that thermoplastic copolymer A was changed to thermoplastic copolymer C.

Example 7

A coated printing paper was obtained in the same manner as in Example 1, except that surface sizing agent A was changed to styrene-maleic acid surface sizing agent D.

Example 8

A coated printing paper was obtained in the same manner as in Example 1, except that the amount of surface sizing agent A was changed to 50 parts.

Example 9

A coated printing paper was obtained in the same manner as in Example 1, except that the amount of surface sizing agent A was changed to 110 parts.

Comparative Example 1

A coated printing paper was obtained in the same manner as in Example 1, except that only 100 parts of thermoplastic copolymer A was used.

Comparative Example 2

A coated printing paper was obtained in the same manner as in Example 1, except that only 100 parts of sizing agent A was used.

Comparative Example 3

A coated printing paper was obtained in the same manner as in Example 1, except that thermoplastic copolymer A was changed to thermoplastic copolymer D.

Comparative Example 4

A coated printing paper was obtained in the same manner as in Example 1, except that 10 parts of surface sizing agent A was changed to 1 part of viscosity-adjusting agent.

Comparative Example 5

A coated printing paper was obtained in the same manner as in Example 1, except that surface-layer coating solution was not applied on the base material (pigment-coated paper).

Example 10

A coated printing paper was obtained in the same manner as in Example 1, except that super calendering was not given.

Comparative Example 6

A coated printing paper was obtained in the same manner as in Example 1, except that surface-layer coating solution was not applied on the base material (pigment-coated paper) and that calendering was not given, either.

Table 1 shows the results of quality evaluation tests performed on the coated papers obtained above.

TABLE 1

| | Thermoplastic copolymer A Tg 107° C. | Thermoplastic copolymer B Tg 85° C. | Thermoplastic copolymer C Tg 100° C. | Thermoplastic copolymer D Tg 72° C. | Sizing agent A | Sizing agent B | Sizing agent C | Sizing agent D | Viscosity-adjusting agent |
|---|---|---|---|---|---|---|---|---|---|
| Example 1 | 100 | | | | 10 | | | | |
| Example 2 | 100 | | | | | 10 | | | |
| Example 3 | | 100 | | | 10 | | | | |
| Example 4 | 100 | | | | 10 | | | | |
| Example 5 | 100 | | | | | | 10 | | |
| Example 6 | | | 100 | | 10 | | | | |
| Example 7 | 100 | | | | | | | 10 | |
| Example 8 | 100 | | | | 50 | | | | |
| Example 9 | 100 | | | | 110 | | | | |
| Comparative Example 1 | 100 | | | | | | | | |
| Comparative Example 2 | | | | | 100 | | | | |
| Comparative Example 3 | | | | 100 | 10 | | | | |
| Comparative Example 4 | 100 | | | | | | | | 1 |
| Comparative Example 5 | Base material (pigment coating layer) only | | | | | | | | |
| Example 10 | 100 | | | | 40 | | | | |
| Comparative Example 6 | Base material (pigment coating layer) only | | | | | | | | |

| | Calendering | Mottled impression | Ink-drying property | Sheet gloss (%) | Separation during calendering |
|---|---|---|---|---|---|
| Example 1 | S/P (65° C.) | ○ | ○ | 89 | ○ |
| Example 2 | S/P (65° C.) | ○ | ○ | 89 | ○ |
| Example 3 | S/P (65° C.) | ○ | ○ | 87 | ○ |
| Example 4 | HSNC (180° C.) | ○ | ○ | 87 | ○ |
| Example 5 | S/P (65° C.) | ○ | ○ | 82 | ○ |
| Example 6 | S/P (65° C.) | ○ | ○ | 88 | ○ |
| Example 7 | S/P (65° C.) | ○ | ○ | 83 | ○ |
| Example 8 | S/P (65° C.) | ○ | ○ to Δ | 89 | ○ |
| Example 9 | S/P (65° C.) | ○ | Δ | 89 | ○ |
| Comparative Example 1 | S/P (65° C.) | X | ○ | 89 | Δ |
| Comparative Example 2 | S/P (65° C.) | ○ | X | 88 | ○ |
| Comparative Example 3 | S/P (65° C.) | ○ | Δ | 73 | Δ |
| Comparative Example 4 | S/P (65° C.) | X | ○ | 76 | Δ |
| Comparative Example 5 | S/P (65° C.) | ○ | ○ | 73 | ○ |
| Example 10 | Not given | ○ | ○ | 65 | — |
| Comparative Example 6 | Not given | ○ | ○ | 45 | — |

Reference:
White-paper gloss of OK Enamel White (Oji Paper), commercial cast-coated paper: 87%
White-paper gloss of SA Kanefuji (Oji Paper), commercial super art paper: 80%

The evaluation items shown in Table 1 and respective test methods are explained below:

Glass-transition temperature—Prepared a film from each sample at 20° C. and 65% (relative humidity) and calculated its glass-transition temperature using the characteristic curve obtained by measuring 20 mg of the film on a differential scanning calorimeter (DSC6200R by Seiko Instruments) by raising temperature at 5° C. per minute in a range from 0 to 100° C.

Sheet gloss—Measured on a Murakami gloss meter based on the 75° reflection method.

Ink-drying property—Each sample was printed on using a RI-II print tester, after which a white paper was pressed against the printed surface to visually evaluate the transfer of ink onto the white paper. Ink transfer was evaluated on three scales, with "o" indicating very small ink transfer onto the white paper, "Δ" indicating small ink transfer and "X" indicating significant ink transfer.

Mottled impression—Each sample was printed on at a speed of 8,000 sheets per hour on an offset four-color sheet-feed press (R304 by MAN ROLAND), using HYECOO M (by Toyo Ink) in the order of black, blue, red and yellow, and mottled impression of blue color was evaluated visually.

Mottled impression was evaluated on three scales, with "o" indicating no mottled impression, "Δ" indicating slight mottled impression and "X" indicating significant mottled impression.

Separation from calender rolls—Deposits left on the metal roll surface was visually evaluated after calendering.

"o" indicates good separation with no deposits left on the metal roll surface, "Δ" indicates insufficient separation with slight deposits left on the metal roll surface, and "X" indicates poor separation with significant deposits left on the metal roll surface.

As shown in Table 1, all coated printing papers obtained in accordance with the present invention achieved high gloss. Printability in terms of mottled impression and ink-drying property is also excellent or at a practical level.

On the other hand, those obtained in the comparative examples have problems, such as insufficient gloss, mottled impression and slow drying of ink, and therefore do not meet the purpose of the present invention.

INDUSTRIAL FIELD OF APPLICATION

A coated printing paper provided by the present invention comprises a base material and a pigment coating layer formed on top, wherein a surface layer formed by applying and drying a mixed solution of a thermoplastic copolymer with a glass-transition temperature of 80° C. or above and a surface sizing agent is formed on the coating layer. A coated printing paper provided by the present invention offers high gloss, no mottled impression, and sufficiently practical levels of printability in terms of ink-drying property and surface peel strength, and it also eliminates deposits on the calender rolls and thereby leads to good productivity.

What is claimed is:

1. A coated paper for offset printing which is hot-air dried or calendered and comprises a base paper and a coating layer comprising pigment and adhesive formed on the base paper, wherein a surface layer comprising a thermoplastic polymer constituted by thermoplastic polymer particles having a glass-transition temperature of 80° C. or above and an average particle size of 100 nm or less, and a surface sizing agent is formed on the coating layer, said coating layer and said surface layer being formed on the base paper in this order, the thermoplastic polymer particles and surface sizing agent account for 80 to 100 weight-percent of the overall surface layer in solid content, the surface sizing agent is at least one copolymer selected from the group consisting of a copolymer of styrene-acrylic, a copolymer of olefins, and a copolymer of styrene-maleic acid, the thermoplastic polymer particles remain as particles after hot-air drying or calendering, whereas the surface sizing agent is of a solution or emulsion type and does not remain as particles after hot-air drying or calendering, wherein in the surface layer, voids formed by the thermoplastic polymer particles are filled or covered by the surface sizing agent, the weight of the surface layer is 0.1 to 3.0 g/m$^2$, and the surface layer contains 3 to 100 weight-parts of the surface sizing agent for 100 weight-parts of the thermoplastic polymer particles.

2. The coated paper for offset printing as described in claim 1, wherein the sizing agent is of a solution type.

3. The coated paper for offset printing as described in claim 1, wherein the copolymer constituting the surface sizing agent has an average molecular weight of 1,000 to 500,000.

* * * * *